(12) United States Patent
Nogi et al.

(10) Patent No.: US 6,800,046 B2
(45) Date of Patent: Oct. 5, 2004

(54) TOROIDAL-TYPE CONTINUOUSLY VARIABLE TRANSMISSION

(75) Inventors: Takashi Nogi, Kanagawa (JP); Norihisa Kobayashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/954,008

(22) Filed: Sep. 18, 2001

(65) Prior Publication Data

US 2002/0035004 A1 Mar. 21, 2002

(30) Foreign Application Priority Data

Sep. 19, 2000 (JP) ........................................ 2000-283611

(51) Int. Cl.[7] ............................................... F16H 15/38
(52) U.S. Cl. .......................... 476/40; 384/470; 384/614
(58) Field of Search .............................. 476/40, 42, 46; 384/470, 614

(56) References Cited

U.S. PATENT DOCUMENTS

| | | | | |
|---|---|---|---|---|
| 4,425,011 A | * | 1/1984 | Cunningham et al. | 384/571 |
| 5,328,277 A | * | 7/1994 | Moulton | 384/572 |
| 5,391,126 A | | 2/1995 | Fukushima et al. | |
| 5,575,733 A | | 11/1996 | Machida et al. | |
| 6,083,137 A | | 7/2000 | Kato et al. | |
| 6,368,245 B1 | * | 4/2002 | Goto et al. | 476/46 |

FOREIGN PATENT DOCUMENTS

| | | | |
|---|---|---|---|
| DE | 10018978 A1 | * 12/2000 | F16H/15/38 |
| JP | 62-71465 | 5/1987 | |
| JP | 62-199557 | 12/1987 | |
| JP | 5-71515 | 9/1993 | |
| JP | 6-16753 | 3/1994 | |
| JP | 7-35847 | 7/1995 | |
| JP | 7-174146 | 7/1995 | |
| JP | 9-42403 | 2/1997 | |
| JP | 10-141462 | 5/1998 | |
| JP | 10-196754 | 7/1998 | |
| JP | 10-246301 | 9/1998 | |
| JP | 11-94042 | 4/1999 | |
| JP | 11-118011 | 4/1999 | |
| JP | 2000-220711 | 8/2000 | |
| JP | 2000-310308 | 11/2000 | |
| JP | 2001-4003 | 1/2001 | |
| JP | 2001-50360 | 2/2001 | |
| JP | 2001-99252 | 4/2001 | |
| JP | 2001-99253 | 4/2001 | |

OTHER PUBLICATIONS

Japanese Abstract No. 07174146, dated Jul. 11, 1995.

* cited by examiner

*Primary Examiner*—David A. Bucci
*Assistant Examiner*—Timothy McAnulty
(74) *Attorney, Agent, or Firm*—Sughrue Mion, PLLC

(57) ABSTRACT

In the inner and outer surfaces of the retainer 34b, there are formed recessed grooves 40a, 40a which serve as lubricating oil flow passages for allowing lubricating oil to flow into pockets. Where the axial-direction depth of the recessed groove 40a, 40a is expressed as H and the circumferential-direction width thereof is expressed as 2L, $0.29 \leq H/L \leq 0.88$ can be satisfied. Accordingly, it is possible to provide a toroidal-type continuously variable transmission which can prevent the damage of a retainer 34b incorporated into a thrust rolling bearing for supporting a power roller and also can enhance the lubricating efficiency of the present thrust rolling bearing.

3 Claims, 8 Drawing Sheets

PRIOR ART FIG.14

TOROIDAL-TYPE CONTINUOUSLY VARIABLE TRANSMISSION

BACKGROUND OF THE INVENTION

The present invention relates to a toroidal-type continuously variable transmission which is used, for example, as a transmission unit in an automatic transmission for a vehicle or as a transmission for various kinds of industrial machines.

As a transmission unit for use in an automatic transmission of a vehicle, such a toroidal-type continuously variable transmission as generally shown in FIGS. 6 and 7 has been studied and enforced in some sectors of a car industry. This toroidal-type continuously variable transmission is structured such that, for example, as disclosed in Japanese Utility Model Unexamined Publication No. Sho.62-71645, an input side disk 2 is supported concentrically with an input shaft 1 and an output side disk 4 is fixed to the end portion of an output shaft 3. On the inner surface of a casing in which a toroidal-type continuously variable transmission is stored, or, on support brackets disposed within the casing, there are disposed trunnions 6, 6 which can be respectively swung about their associated pivot shafts 5, 5 disposed at twisted positions with respect to the input shaft 1 and output shaft 3.

That is, the trunnions 6, 6 are disposed as follows. Namely, their respective pivot shafts 5, 5 are disposed on the outer surfaces of the two end portions of the trunnions 6, 6 in such a manner that they are concentric with each other as well as extend at right angles or substantially at right angles to the direction of the input and output shafts 1 and 3. Also, there are disposed displacement shafts 7, 7 on their respective trunnions 6, 6 in such a manner that the base end portions of the displacement shafts 7, 7 are supported on the central portions of their respective trunnions 6, 6. In case where the trunnions 6, 6 are swung about their associated pivot shafts 5, 5, the inclination angles of the displacement shafts 7, 7 can be adjusted freely. Further, on the peripheries of the displacement shafts 7, 7 supported on their respective trunnions 6, 6, there are supported power rollers 8, 8 in such a manner that they can be rotated. And, the power rollers 8, 8 are held by and between the input side and output side disks 2, 4. The mutually opposing inner surfaces 2a, 4a of the input side and output side disks 2, 4 are each formed in a concave surface whose section shows an arc shape with a point on the center axis of the pivot shaft 5 as a center thereof. And, the peripheral surfaces 8a, 8a of the power rollers 8, 8, which are respectively formed as spherically convex surfaces, are contacted with the inner surfaces 2a, 4a of the input side and output side disks 2, 4.

Also, between the input shaft 1 and input side disk 2, there is interposed a pressing device 9 of a loading cam type in such a manner that the pressing device 9 pushes elastically the input side disk 2 toward the output side disk 4. The pressing device 9 is composed of a cam plate 10 rotatable together with the input shaft 1 and a plurality of (for example, 4) rollers 12, 12 respectively held by a retainer 11. On one side surface (in FIGS. 6 and 7, on the left side surface) of the cam plate 10, there is formed a cam surface 13 which is a concavo-convex surface extending in the circumferential direction of the cam plate 10. On the outer surface (in FIGS. 6 and 7, on the right side surface) of the input side disk 2 as well, there is formed a cam surface 14 which is similar to the cam surface 13. And, the plurality of rollers 12, 12 are supported in such a manner that they can be rotated about an axis extending in a radial direction with respect to the center of the input shaft 1.

When the above-structured toroidal-type continuously variable transmission is in use, in case where the cam plate 10 is rotated with the rotation of the input shaft 1, the cam surface 13 presses the plurality of rollers 12, 12 against the cam surface 14 formed on the outer surface of the input side disk 2. As a result of this, the input side disk 2 is pressed against the plurality of power rollers 8, 8 and, at the same time, in accordance with the mutually pressing actions between the pair of cam surfaces 13, 14 and the plurality of power rollers 8, 8, the input side disk 2 is rotated. And, the rotation of the input side disk 2 is transmitted through the plurality of power rollers 8, 8 to the output side disk 4, thereby rotating the output shaft 3 which is fixed to the output side disk 4.

Now, description will be given below of a case where the rotation speeds of the input shaft 1 and output shaft 3 are changed. First, to decelerate the rotation speed between the input shaft 1 and output shaft 3, the trunnions 6, 6 may be respectively swung in a given direction about their associated pivot shafts 5, 5. And, as shown in FIG. 6, the displacement shafts 7, 7 may be respectively inclined in such a manner that the peripheral surfaces 8a, 8a of the power rollers 8, 8 can be respectively contacted with the near-to-center portion of the inner surface 2a of the input side disk 2 and with the near-to-outer-periphery portion of the inner surface 4a of the output side disk 4. On the other hand, in the case of acceleration, the trunnions 6, 6 may be respectively swung in the opposite direction to the above given direction. And, as shown in FIG. 7, the displacement shafts 7, 7 may be respectively inclined in such a manner that the peripheral surfaces 8a, 8a of the power rollers 8, 8 can be respectively contacted with the near-to-outer-periphery portion of the inner surface 2a of the input side disk 2 and with the near-to-center portion of the inner surface 4a of the output side disk 4. By the way, in case where the inclination angles of the displacement shafts 7, 7 are set in the intermediate angles between those shown in FIGS. 6 and 7, there can be obtained an intermediate gear change ratio between the input shaft 1 and output shaft 3.

Further, FIG. 8 shows a toroidal-type continuously variable transmission disclosed in Japanese Utility Model Unexamined Publication No. Sho.62-199557, which is a further concrete version of the transmission for a vehicle. Specifically, in this toroidal-type continuously variable transmission, the rotation of a crank shaft provided in the engine of the vehicle is transmitted through a clutch 15 to an input shaft 16 to thereby rotate a cam plate 10 which is spline engaged with the intermediate portion of the input shaft 16. And, due to the operation of a pressing device 9 including the cam plate 10, an input side disk 2 is pushed and rotated to the left in FIG. 8 toward an output side disk 4. The rotation of the input side disk 2 is transmitted to the output side disk 4 through power rollers 8, 8.

The output side disk 4 is supported on the periphery of the input shaft 16 by a needle roller bearing 17. Also, a cylindrical-shaped output shaft 18, which is formed integral with the output side disk 4, is supported on the interior of a housing 19 by a ball bearing 20 of an angular type. On the other hand, one end (in FIG. 8, the right end) of the input shaft 16 is rotatably supported on the interior of the housing 19 by a roller bearing 21. At this time, the other end thereof is rotatably supported on the interior of the housing 19 by a ball bearing 22 of an angular type through a sleeve 23.

Also, a transmission gear 26, which is an integral body of a drive side advancing gear 24 and a drive side retreating gear 25, is spline engaged with the outer peripheral surface of the output shaft 18. When advancing the vehicle, the transmission gear 26 is moved to the right in FIG. 8 to thereby bring the drive side advancing gear 24 into direct meshing engagement with a driven side advancing gear 28 disposed in the intermediate portion of a take-out shaft 27. On the other hand, when retreating the vehicle, the transmission gear 26 is moved to the left in FIG. 8 to thereby bring the drive side retreating gear 25 into meshing engagement with a driven side retreating gear 29 disposed in the intermediate portion of the take-out shaft 27 through an intermediate gear (not shown).

When the above-structured toroidal-type continuously variable transmission is in use, in case where the input shaft 16 is rotated through the clutch 15 by the engine to thereby move the transmission gear 26 in a proper direction, the take-out shaft 27 can be rotated in an arbitrary direction. In case where the respective trunnions 6, 6 are swung to thereby change the contact positions between the peripheral surfaces 8a, 8a of the power rollers 8, 8 and the inner surfaces 2a, 4a of the input side and output side disks 2, 4, the rotation speed ratio between the input shaft 16 and take-out shaft 27 can be changed.

When the above-structured toroidal-type continuously variable transmission is in operation, in accordance with the operation of the pressing device 9, the input side disk 2 is pushed toward the output side disk 4. As a result of this, as a reaction force caused by the above pressure, a thrust load going in the right direction in FIG. 8 is applied to the input shaft 16 which supports the cam plate 10 forming the pressing device 9. This thrust load is supported by the ball bearing 22 through the sleeve 23 as well as through a nut 30 which is threadedly engaged with the end portion of the input shaft 16. Also, due to the operation of the pressing device 9, a thrust load going in the left direction in FIG. 8 is applied to the output shaft 18 through the input side and output side disks 2, 4 as well as through the power rollers 8, 8. This thrust load is supported by the ball bearing 20 through a stop ring 31 which is fitted with the outer surface of the output shaft Also, when the above-structured toroidal-type continuously variable transmission is in operation, not only the thrust loads are applied to the input shaft 16 and output shaft 18 but also thrust loads are applied to the power rollers 8, 8 as well. For this reason, between the power rollers 8, 8 and their associated trunnions 6, 6, there are interposed thrust rolling bearings 32, 32 respectively; that is, the thrust loads applied to the power rollers 8, 8 are supported by these thrust rolling bearings 32, 32. These thrust rolling bearings 32, 32 are each composed of a plurality of rolling bodies 33, 33, a retainer 34 for holding the plurality of rolling bodies 33, 33 therein in such a manner that they are free to roll, and an outer race 35. The plurality of rolling bodies 33, 33 are each formed of bearing steel or ceramics in a spherical shape or in a taper roller shape. These rolling bodies 33, 33 can be rollingly contacted with raceway surfaces (that is, inner race raceways) formed on the outer end faces of the power rollers 8, 8 as well as with raceway surfaces (that is, outer race raceways) formed on the inner surfaces of the outer races 35. Also, the retainer 34 is formed of metal or synthetic resin in a circular ring shape. And, the retainer 34 includes a plurality of pockets 36, 36 which are formed in the diameter-direction intermediate portion thereof in such a manner that they are spaced at regular intervals in the circumferential direction thereof; and, the rolling bodies 33, 33 are rollably held in these pockets 36, 36, one in one. Further, the outer races 35, 35, each of which is formed of bearing steel or ceramics in a circular ring shape, are butted against the inner surfaces of their associated trunnions 6 through thrust bearings 37 (see FIG. 9 which will be discussed later).

The above-described thrust rolling bearings 32, 32, when the toroidal-type continuously variable transmission is in operation, rotate at a high speed while supporting the thrust loads applied to their associated power rollers 8, 8. Therefore, when the toroidal-type continuously variable transmission is in operation, a sufficient quantity of lubricating oil must be supplied to the respective thrust rolling bearings 32, 32. Conventionally, as shown in FIG. 9, one or more oil supply holes 38, 38 are formed in part of the outer race 35 and, when the toroidal-type continuously variable transmission is in operation, lubricating oil is forcibly fed into these oil supply holes 38, 38. The lubricating oil forcibly fed into the oil supply holes 38, 38 flows through a clearance between the inner surface of each outer race 35 and the outer surface of the retainer 34 and also through a clearance between the inner surface of the retainer 34 and the outer end face of each power roller 8. Accordingly, it is possible to lubricate the rolling portions of the plurality of rolling bodies 33, 33.

By the way, in the case of the above-mentioned conventional structure in which the lubricating oil is fed into the thrust rolling bearings 32, 32 in the above-mentioned manner, there is a possibility that supply of the lubricating oil can be short in part of the thrust rolling bearings 32, 32.

That is, as shown in FIG. 10(A), in case where the retainer 34 is situated at an intermediate position between the inner surface of the outer race 35 and the outer end face of the power roller 8, the lubricating oil is allowed to flow into both upper and lower clearances. At this time, the upper clearance means the clearance between the inner surface of each outer race 35 and the outer surface of the retainer 34, and the lower clearance means the clearance between the inner surface of the retainer 34 and the outer end face of each power roller 8. Therefore, in this situation there raises no problem.

However, in case where the lubricating oil is jetted out from the oil supply hole 38 formed in the outer race 35 toward the outer surface of the retainer 34, the retainer 34 is pushed by the flow of the lubricating oil. At this time, as shown in FIG. 10(B), the retainer 34 may be shifted toward the power roller 8 side. Further, if the inner surface of retainer 34 and the outer end face of the power roller 8 are closely contacted with each other due to such shift of the retainer, a sufficient quantity of lubricating oil cannot be present in the contact portions that are defined between the respective rolling bodies 33 and the raceway surfaces formed in the outer end faces of the power rollers 8. As a result of this, there is a possibility that the wear amount can increase in the contact portions between the raceway surfaces of the outer end faces of the power rollers 8 and the rolling surfaces of the respective rolling bodies 33, or, in case where the wear amount is great, the contact portions can be seized.

In order to solve the above problem, in U.S. Pat. No. 5,575,733, there is disclosed a toroidal-type continuously variable transmission which incorporates therein such a thrust rolling bearing 32a as shown in FIGS. 11 to 14 that is enhanced in the lubricating efficiency. A main body 39 of a retainer 34a forming the thrust rolling bearing 32a is formed of synthetic resin or metal such as copper in a circular ring shape as a whole. In the diameter-direction intermediate portion of the main body 39, more specifically, at two or more positions in the circumferential direction thereof, there are formed pockets 36 so as to correspond in shape to a rolling body 33 which is to be held by the pocket 36. And, in the inner and outer surfaces of the main body 39, recessed grooves 40, 40 are formed. The recessed grooves 40, 40 respectively extend in the diameter direction of the main body 39 to cross the pockets 36. The recessed grooves 40, 40 form lubricating oil flow passages between the inner and outer peripheral edges of the main body 39.

According to the above-structured toroidal-type continuously variable transmission incorporating therein the thrust rolling bearing 32a enhanced in the lubricating efficiency thereof, due to the energy of the lubricating oil jetted out from an oil supply hole 38 formed in the outer race 35, the retainer 34a forming the thrust rolling bearing 32a is shifted in the axial direction thereof. Accordingly, as shown in FIG. 14, even if the inner surface of the retainer 34a and the outer end face of the power roller 8 are closely contacted with each other, a lubricating oil flow passage can be provided by a space enclosed by the inner surfaces of the recessed grooves 40, 40 and the outer end face of the power roller 8. Further, a sufficient quantity of lubricating oil is allowed to flow through the recessed grooves 40, 40 into the pockets 36 respectively holding their associated rolling bodies 33 therein. As a result of this, it is possible to prevent the possibility that the lubricating oil present in the raceway surface formed in the outer end face of the power roller 8 and the rolling surfaces of the rolling bodies 33 can be short. Further, it is possible to reduce the danger that the thrust rolling bearing 32a is worn excessively in part or is seized.

In the case of the toroidal-type continuously variable transmission which is shown in FIGS. 11 to 14 and incorporates therein the thrust rolling bearing 32a, when compared with the other conventional toroidal-type continuously variable transmission, the durability and reliability thereof can be enhanced. On the other hand, in order to secure the durability of the respective components thereof, the following points must be taken into consideration. Firstly, to be able to secure the durability of the thrust rolling bearing 32a, it is necessary to increase the flow quantity of the lubricating oil which flows through the interior of the thrust rolling bearing 32a. In this case, preferably, the section areas of the recessed grooves 40, 40 formed in the inner and outer surfaces of the retainer 34a may be set as large as possible. However, since the formation of the recessed grooves 40, 40 reduces the thickness of the retainer 34a in the recessed grooves 40, 40 portions thereof, in case where the section areas of the recessed grooves 40, 40 are increased excessively, the retainer 34a becomes easy to be damaged. This will be discussed below in detail with reference to FIGS. 11 and 13.

In case where the retainer 34a becomes eccentric as shown in FIG. 11, the rolling body 33 is moved to one side within the pocket 36, so that the rolling body 33 presses against the inner surface of the pocket 36 in a radial direction with a load of F. In this state, in case where the two intermediate portions 41 (FIGS. 12 and 13) of the pair of recessed grooves 40, 40 formed at the mutually corresponding positions of the inner and outer surfaces of the retainer 34a are approximated to each other using a support beam with the two ends thereof fixed, the maximum bending stress a occurring in the intermediate portions 41, from the viewpoint of the strength of materials, can be expressed by the following expression (1): that is, $$\sigma = 3WL/4B^2(T-H) \tag{1}$$

In this expression (1), L expresses the circumferential-direction half width of the recessed grooves 40, 40 (that is, 2L is the width of the recessed grooves 40, 40 in the circumferential direction of the retainer 34a), B expresses the radial-direction length of the recessed grooves 40, 40, and H expresses the axial-direction depth of the recessed grooves 40, 40. Also, the thickness of the other portions of the retainer 34a than the recessed grooves 40, 40 is set for 2T.

Here, the expression (1) is turned into a dimensionless expression to thereby define a dimensionless stress σ' which can be expressed by the following expression (2): that is, $$\sigma' = 4B^2\sigma/3W = L/(T-H) \tag{2}$$

As can be understood from the thus obtained expression (2), σ' increases as the half-width L and depth H of the recessed grooves 40, 40 increase. This means that, in case where the section area of each of the recessed grooves 40, 40 is increased, the retainer 34a becomes easier to be damaged. Therefore, in order that the retainer 34a can be made difficult to be damaged regardless of the radial load applied from the rolling body 33, preferably, the half-width L and depth H may be reduced. However, in case where the half-width L and depth H are reduced to thereby decrease the section areas of the recessed grooves 40, 40, there is a possibility that the quantity of the lubricating oil fed into the pocket 36 can be short to thereby make worse the wear of the contact portion between the rolling surface of the rolling body 33 held by this pocket 36 and its mating raceway surface.

SUMMARY OF THE INVENTION

The present invention aims at eliminating the above-mentioned drawbacks found in the conventional toroidal-type continuously variable transmissions. Accordingly, it is an object of the invention to provide a toroidal-type continuously variable transmission wherein the flow quantity of the lubricating oil flowing through the pocket 36 can be increased while maintaining the bending stress occurring in the retainer 34a at a constant level, to thereby be able to enhance the lubricating efficiency of the toroidal-type continuously variable transmission. In other words, it is the object of the present invention to optimize the section shapes of the recessed grooves 40, 40 while increasing the section areas of the recessed grooves 40, 40 without increasing the bending stress, to thereby be able to enhance the lubricating efficiency of the toroidal-type continuously variable transmission.

The above object can be achieved a toroidal-type continuously variable transmission according to the invention. The toroidal-type continuously variable transmission comprises:

first and second disks which are rotatably around center axes thereof respectively and have respective inner side surfaces in opposition to each other, each of the inner side surfaces having a concave section;

a trunnion swingable around an axis transverse to the respective central axes of the first and second disks;

a displacement shaft mounted on the trunnion;

a power roller disposed between the first and second disks and rotatably supported by the displacement shaft, a peripheral surface of the power roller having a convex section that is brought in contact with the inner side surfaces of the first and second disks; and a thrust rolling bearing provided between the power roller and the trunnion to support a load applied to the power roller in a thrust direction, the thrust rolling bearing including a plurality of rolling elements and a retainer for rotatably holding the plurality of rolling elements, wherein the retainer comprises a substantially disk-shaped main body, a plurality of pockets formed in a radially intermediate portion of the main body and holding the rolling elements rotatably therein, and a plurality of lubricating oil flow passages extending between radially inner and outer peripheries of the main body so as to traverse respective pockets, and wherein each of the lubricating oil flow passages satisfy an equation that:

$$0.29 \leq H/L \leq 0.88$$

where H expresses the axial-direction depth of the lubricating oil flow passage and 2L expresses the circumferential-direction width thereof.

In the above-mentioned toroidal-type continuously variable transmission, it is advantageous that the lubricating oil flow passage comprises a recessed groove having a rectangular-shaped section.

In addition, in the above-mentioned toroidal-type continuously variable transmission, it is preferable that the lubricating oil flow passage has an arc-shaped section.

The operation of the above-structured toroidal-type continuously variable transmission according to the invention for transmission of power between the first and second disks as well as the operation thereof for adjustment of a rotation speed ratio between the first and second disks are similar to the operations of the conventional toroidal-type continuously variable transmission shown in FIGS. 6 to 8. Also, the operation of the present toroidal-type continuously variable transmission, in which, by allowing lubricating oil to flow into the pockets of the retainer through the plurality of lubricating oil flow passages formed in the main body of the retainer, the lubricating oil can be supplied into the pockets even if the retainer is shifted in the axial direction thereof, is similar to the operation of the conventional toroidal-type continuously variable transmission shown in FIGS. 11 to 14.

Especially, in a toroidal-type continuously variable transmission according to the invention, a ratio H/L between the axial-direction depth H and circumferential-direction half-width L of each of the lubricating oil flow passages is set in the range from 0.29 to 0.88 with both inclusive. Accordingly there can be eliminated the possibility that the section area of each of the lubricating oil flow passages can be increased unnecessarily and the retainer can be damaged easily. Further, at the same time it is possible that the flow quantities of lubricating oil flowing through the lubricating oil flow passages can be increased. Therefore, it is possible to enhance the lubricating efficiency of the thrust rolling bearing and thus the lubricating efficiency of the present toroidal-type continuously variable transmission.

BRIEF DESCRIPTION OF THE DRAWINGS

FIG. 10 is an enlarged view of the B portion shown in FIG. 9, showing a state in which lubrication is executed properly by the lubricating device shown in FIG. 9 and a state in which lubrication is executed poorly;

FIG. 14 is a view corresponding to the B portion of FIG. 9, showing a thrust rolling bearing portion in which the retainer shown in FIGS. 11 to 13 is incorporated.

DETAILED DESCRIPTION OF THE PREFERRED EMBODIMENTS

Figure 1:
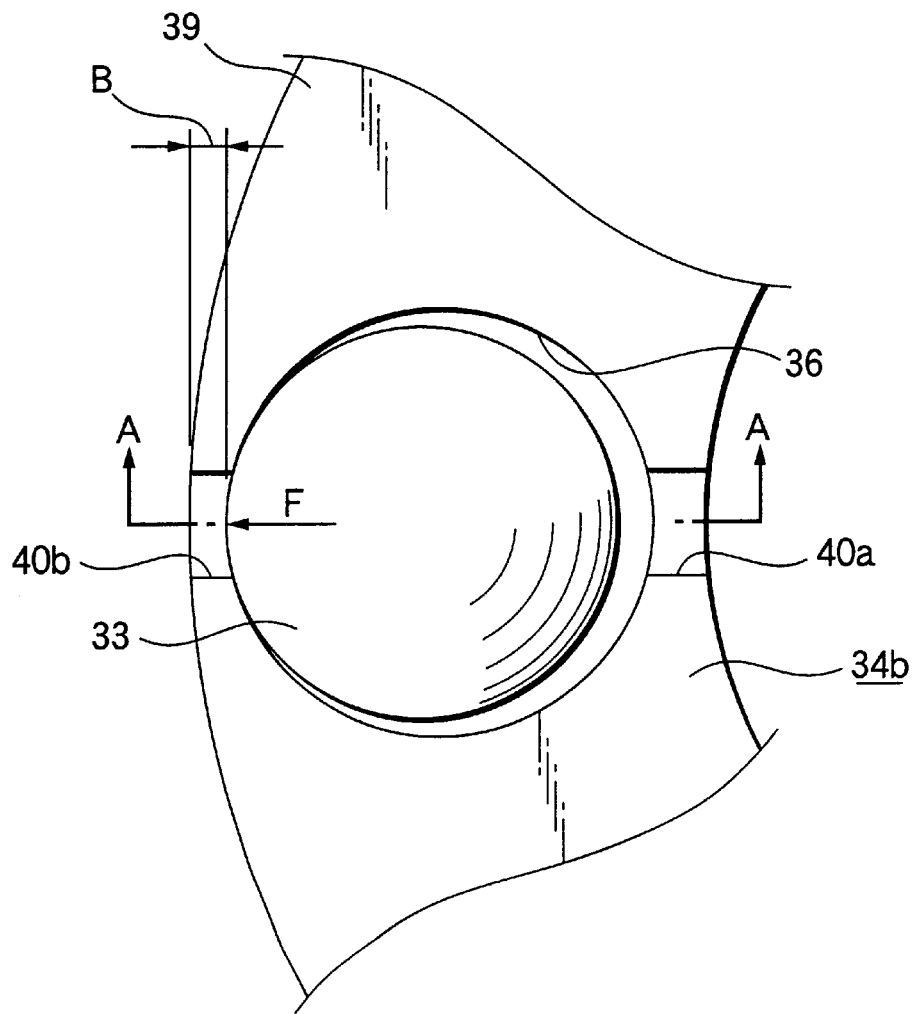
FIG. 1 is a partial plan view of a first embodiment of a retainer according to the invention.
Figure 2:
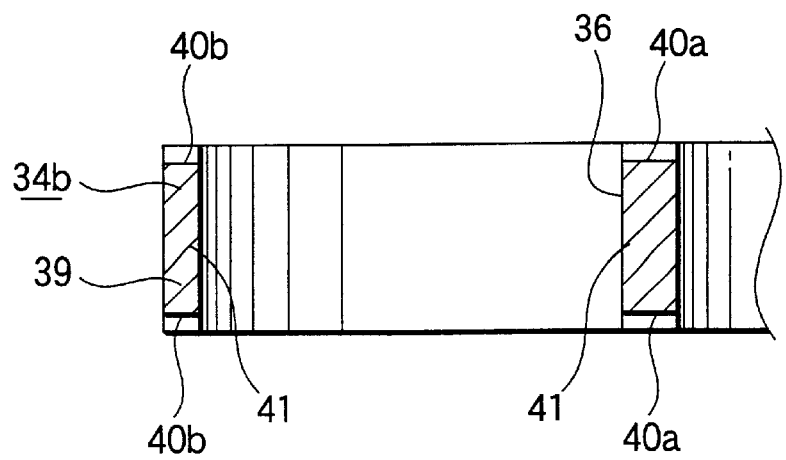
FIG. 2 is a section view taken along the arrow line A—A shown in FIG. 1.
Figure 3:
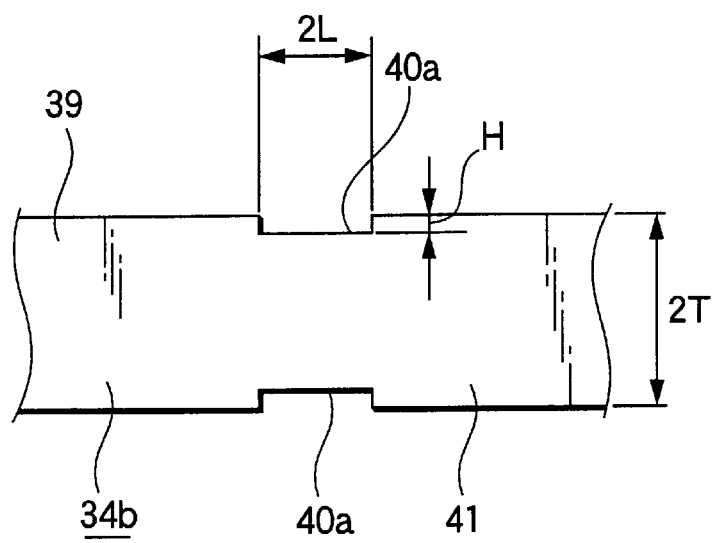
FIG. 3 is a view of the first embodiment, when it is viewed from the right side of FIG. 2.

Now, FIGS. 1 to 3 show a first embodiment of a retainer according to the invention in which, as lubricating oil flow passages, there are formed recessed grooves 40a, 40b each having a section formed in a rectangular shape. By the way, this embodiment can be characterized as follows. By optimizing the section shapes of the recessed grooves 40a, 40b, not only a bending stress occurring in the retainer 34b can be maintained at a constant level (that is, an increase in the bending stress can be controlled) but also the flow quantity of lubricating oil flowing through the recessed grooves 40a, 40b can be increased. Accordingly, it is possible to enhance the lubricating efficiency of the thrust rolling bearing 32a (see FIG. 14). The structure and operations of the remaining portions of the present embodiment are similar to those of the previously described conventional structure. Therefore, the illustration and description of the equivalent portions of the present embodiment to those of the previously described conventional structure are omitted or simplified and, accordingly, description will be given below mainly of the characteristic portions of the embodiment.

Figure 9:
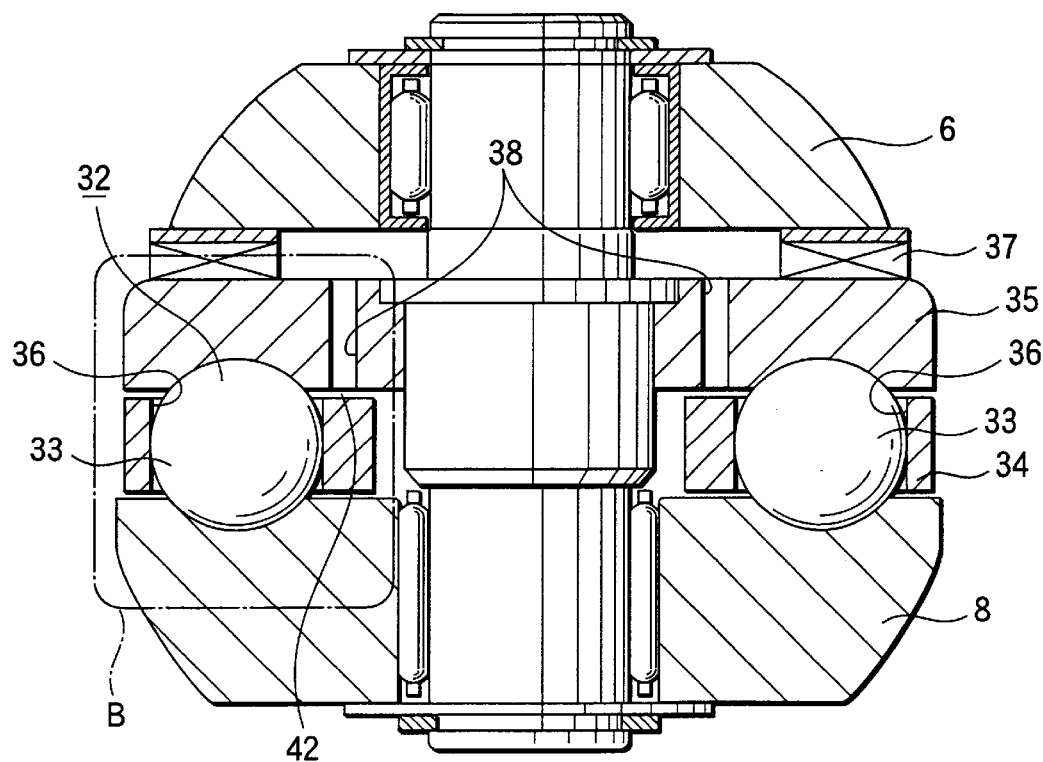
FIG. 9 is a section view of a thrust rolling bearing and its portion to be lubricated by a lubricating device.
Figure 10A:
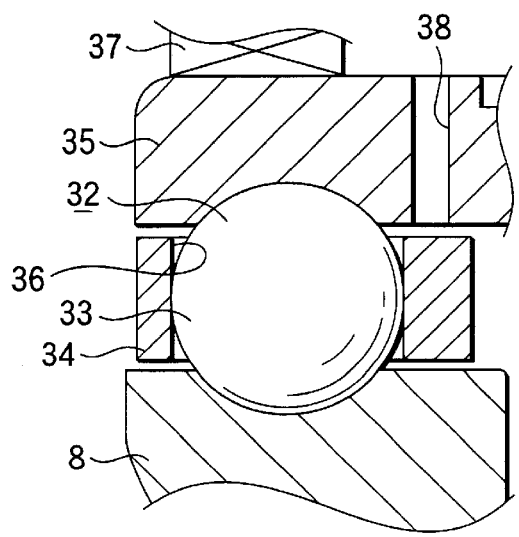
FIGS. 10A and 10B are enlarged views of the B portion shown in FIG. 9, showing a state in which lubrication is executed properly by the lubricating device shown in FIG. 9 and a state in which lubrication is executed poorly.
Figure 10B:
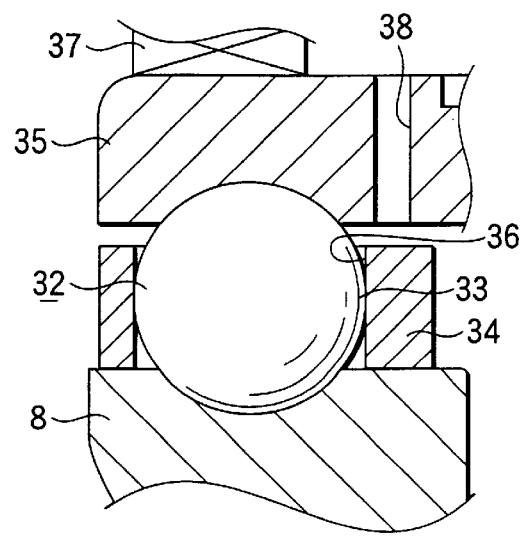
Figure 11:
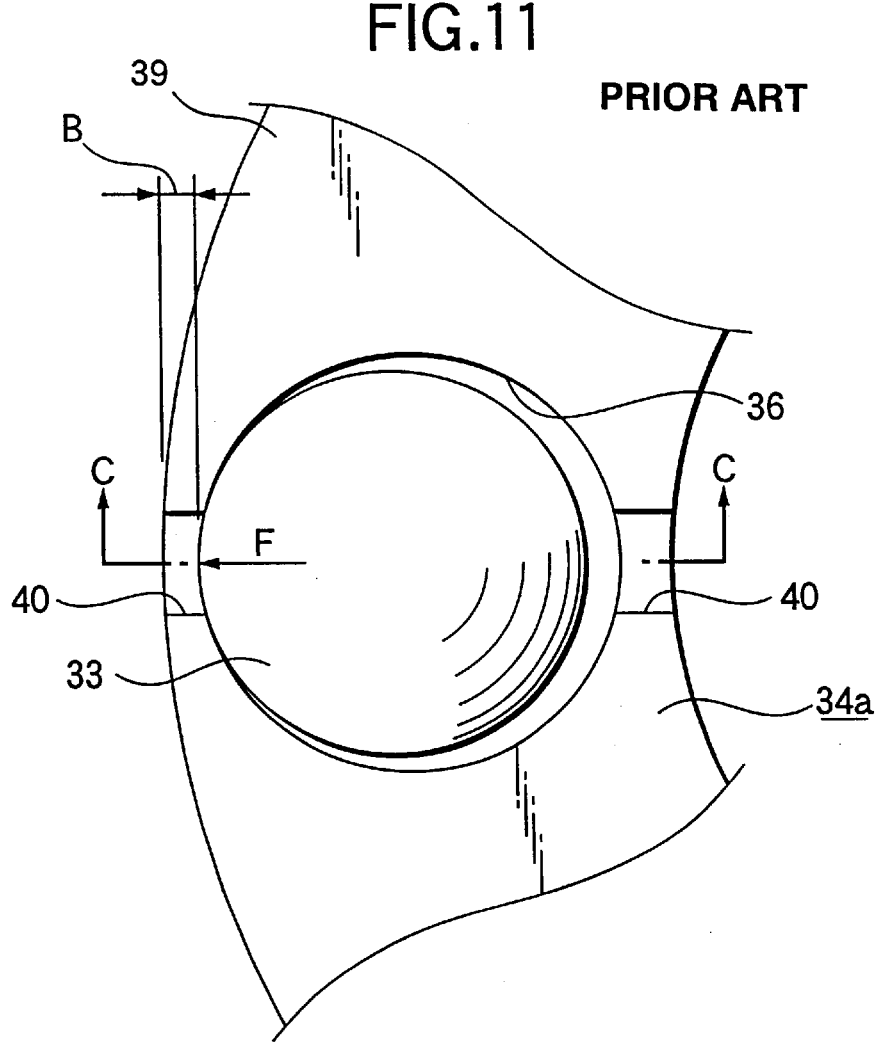
FIG. 11 is a partial plan view of a retainer, showing an example of a conventional structure developed for enhancement of the lubricating efficiency of the retainer.
Figure 12:
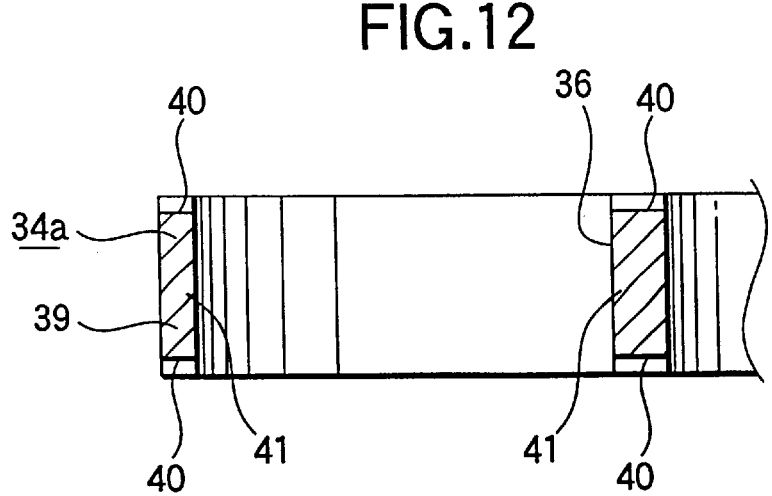
FIG. 12 is a section view taken along the arrow line C—C shown in FIG. 11.
Figure 13:
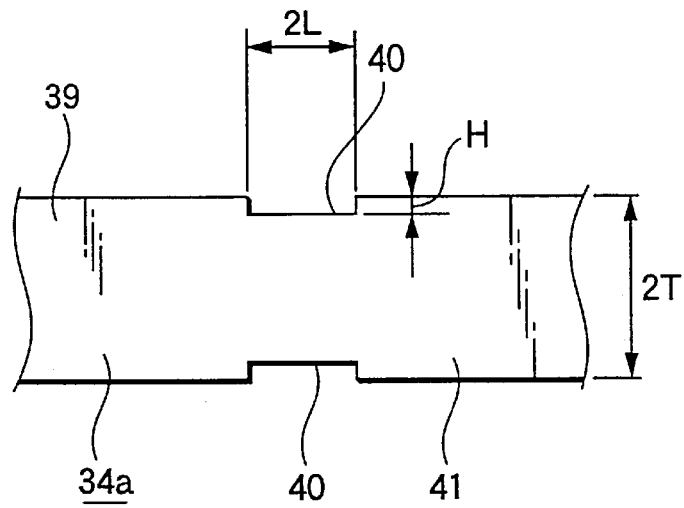
FIG. 13 is a view of the conventional structure, when it is viewed from the right side of FIG. 12.
Figure 13:
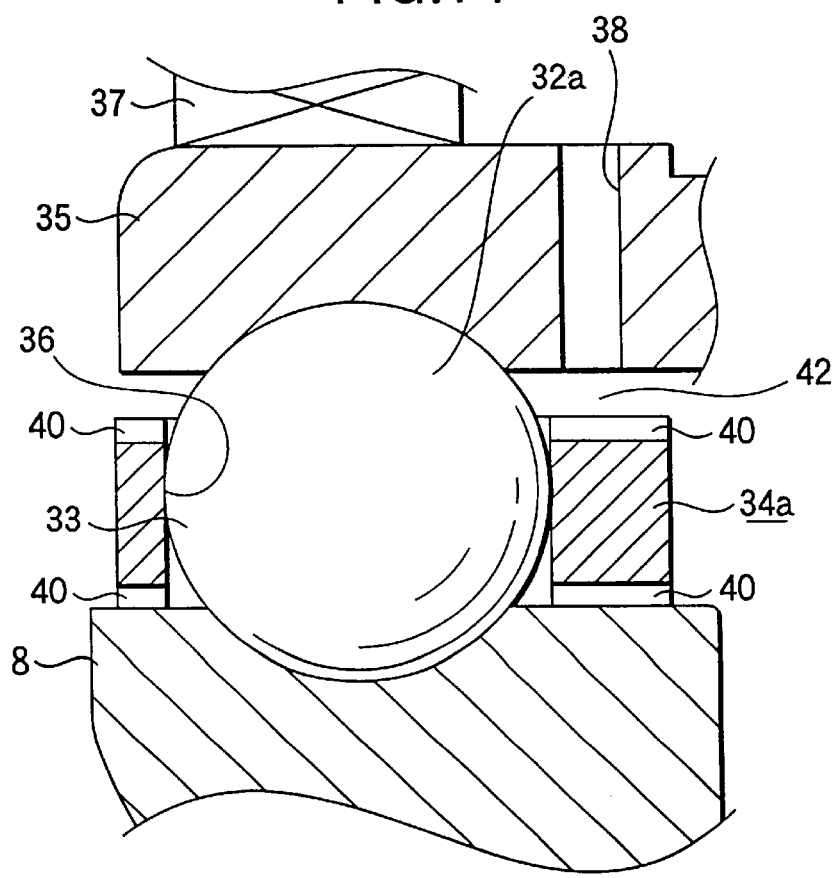

In the intermediate portion of a circular-ring-shaped main body 39 of the retainer 34b in a diameter-direction thereof, there are formed a plurality of pockets 36. These pockets 36 are spaced at regular intervals from one another in the circumferential direction of the main body 39. In the inner and outer surfaces (that is, in the axial-direction two surfaces) of the main body 39, there are formed a plurality of recessed grooves 40a, 40b in such a manner that they respectively cross the pockets 36. These recessed grooves 40a, 40b respectively form a plurality of lubricating oil flow passages which are formed between the inner and outer peripheral edges of the main body 39. When the present toroidal-type continuously variable transmission is in operation, lubricating oil jetted out from the above-mentioned oil supply holes 38 (see FIG. 9) is allowed to flow through the recessed grooves 40a, 40b serving as the lubricating oil flow passages from the inner peripheral edge of the main body 39 to the outer peripheral edge thereof. During such flow of the lubricating oil, the lubricating oil lubricates the contact portions between the rolling surfaces of rolling bodies 33 respectively held within their associated pockets 36 and their respective mating raceway surfaces.

Out of the above-mentioned recessed grooves 40a, 40b forming the lubricating oil flow passages, the recessed grooves 40a, 40a (the upstream-side portions of the lubricating oil flow passages) allow the pockets 36 and the inner peripheral edge of the main body 39 to communicate with each other. Accordingly, it is possible to feed the lubricating oil jetted out from the oil supply holes 38 into the near-to-inside-diameter portion of the retainer 34b within the space 42 (see FIGS. 9 and 14). At this time, the recessed grooves 40a, 40a are restricted in the section shape thereof in such a manner that a ratio H/L between the axial-direction depth H and circumferential-direction half-width L of each of the lubricating oil flow passages can be set in the range from 0.29 to 0.88 with both inclusive. And, in accordance with this restriction, the flow quantity of the lubricating oil flowing through the present recessed grooves 40a, 40a is increased with no need to increase the section area of each of the lubricating oil flow passages.

Also, the recessed grooves 40b, 40b for draining the lubricating oil existing within the respective pockets 36 are also restricted in the section shape thereof in such a manner that the ratio H/L between the axial-direction depth H and the circumferential-direction half-width L of each of the lubricating oil flow passages can be set in the range from 0.29 to 0.88 with both inclusive. And, in accordance with this restriction, the flow quantity of the lubricating oil flowing through the present recessed grooves 40a, 40b is increased without increasing the section area of each of the lubricating oil flow passages to an unnecessary extent.

In the case of a toroidal-type continuously variable transmission incorporating therein the retainer 34b with the lubricating oil flow passages, that comprises the above-mentioned recessed grooves 40a, 40b formed on the inner and outer surfaces thereof, prevention of the damage of the retainer 34b and the properly secured flow quantity of the lubricating oil can be compatible with each other. Namely, even if a radial-direction load F is applied by the eccentric arrangement of the present retainer 34b to the inner surface of the present pocket from each rolling body 33 that is held within its associated pocket 36, a sufficient quantity of lubricating oil can be supplied into the respective recessed grooves 40a, 40b while maintaining the bending stress occurring in the retainer 34b at a constant level (that is, without increasing the bending stress). Specifically, the lubricating oil jetted out from the oil supply hole 38 is allowed to flow into its associated pocket 36 through the recessed groove 40a formed on the inside diameter side of the retainer 34b. Next, this lubricating oil is drained from the pocket 36 to the outside diameter side of the retainer 34b through the recessed groove 40b formed on the outside diameter side of the retainer 34b. In the present embodiment, the section areas of the respective recessed grooves 40a, 40b can be maximized within the predetermined range that can prevent the damage of the retainer 34b. This makes it possible to lubricate highly efficiently the contact portions between the rolling surfaces of the rolling bodies 33 held in their respective pockets 36 and their mating raceway surfaces, thereby being able to prevent these contact portions from wearing any further.

Next, description will be given below of the reason why, by setting the above ratio H/L in the range from 0.29 to 0.88 with both inclusive, not only the retainer can be prevented against damage but also the flow quantity of the lubricating oil flowing through the lubricating oil flow passages can be increased.

Here, the flow quantity Q of the lubricating oil flowing through the lubricating oil flow passages can be expressed by the following equation (3): that is, $$Q \propto A m^{1/2} \quad (3)$$

In the expression (3), A expresses the section area of each lubricating oil flow passage, and m expresses the average depth of the fluid. Also, the fluid average depth m can be expressed by the following expression (4) in terms of fluid dynamics: that is, $$m = A/S = HL/(H+2L) \quad (4)$$

In the expression (4), S expresses the length of the peripheral edge of each lubricating oil flow passage.

Next, description will be given below of a manner in which, while maintaining constant the dimensionless stress σ' expressed in the expression (2), the flow quantity Q of the lubricating oil can be maximized.

If the expressions (2) and (4) are substituted into the expression (3), then there can be obtained the following expression (5): that is, $$Q \propto (A^3/S)^{1/2} \propto Q' \quad (5)$$

In the expression (5), Q' is a dimensionless flow quantity which can be expressed by the following equation (6): that is, $$Q' = (H/L)^{3/2} (T/L - H/L)^{5/2} / (2 + H/L)^{1/2} \quad (6)$$

Using this expression (6), the dimensionless flow quantity Q' can be calculated with T/L and H/L as parameters.

Figure 4:
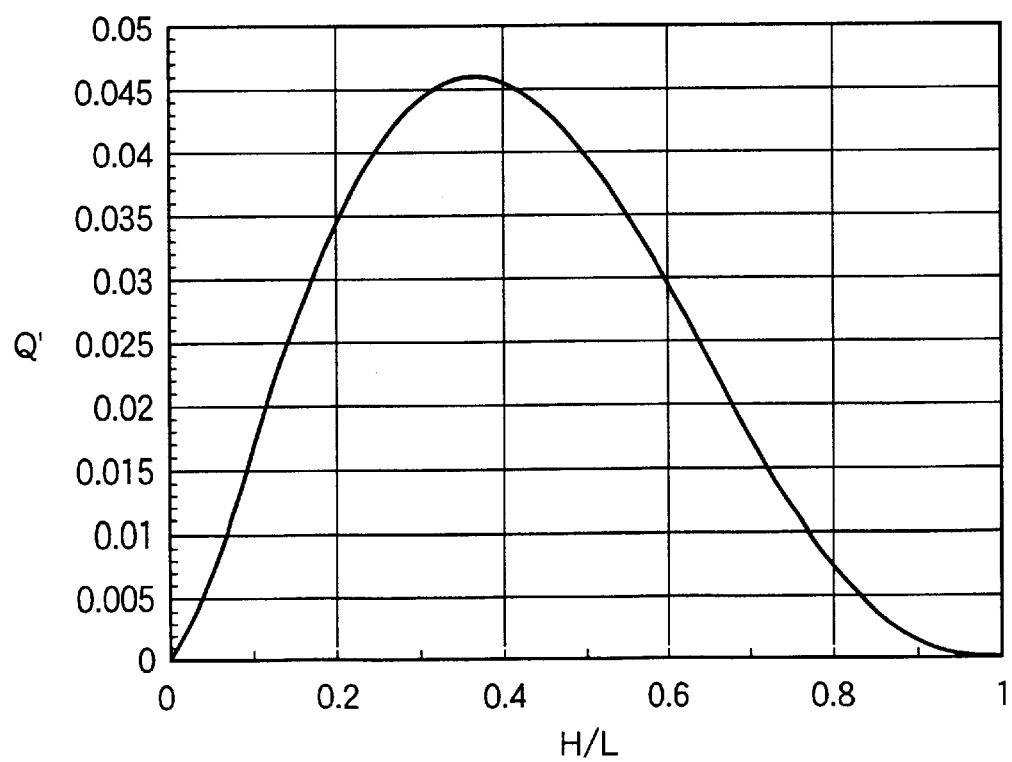
FIG. 4 is a graphical representation of the relationship between a ratio H/L between the axial-direction depth H and circumferential-direction half-width L of each lubricating oil flow passage and a dimensionless flow quantity Q'.

As an example, in FIG. 4, there is shown the relationship between the dimensionless flow quantity Q' and H/L in the case of T/L=1.0. As can be seen clearly from FIG. 4, in the case of H/L=0.35, the dimensionless flow quantity Q' can be maximized, so that the optimum design can be realized from the viewpoint of enhancement in the lubricating efficiency of the retainer 34b. However, when designing the retainer 34b actually, preferably, from the viewpoint of the production cost of the retainer 34b, the value of the ratio H/L may be set in the range of ±20% with respect to the optimum value (0.35).

By the way, T/L=1.0 is an example; that is, the value of this ratio T/L varies according to the specifications of the thrust rolling bearing 32a. In the case of a toroidal-type continuously variable transmission, if the ratio T/L is excessively small, the strength of the retainer is short. On the other hand, if the ratio T/L is excessively large, the flow quantity of the lubricating oil allowed to flow through the interior of the thrust rolling bearing 32a is short. By the way, according to our design experiences, it is preferable that the ratio T/L may be set in the range of 0.8–2.5. In our test, while varying the ratio T/L within this range, there were found the values of the ratio H/L that can maximize the dimensionless flow quantity Q' similarly to the example shown in FIG. 4, the minimum value of the values of the ratio H/L was 0.29 and the maximum value thereof was 0.88. Therefore, in the present invention, based on the above discovery, this ratio H/L is defined such that 0.29≦H/L≦0.88.

Figure 5:
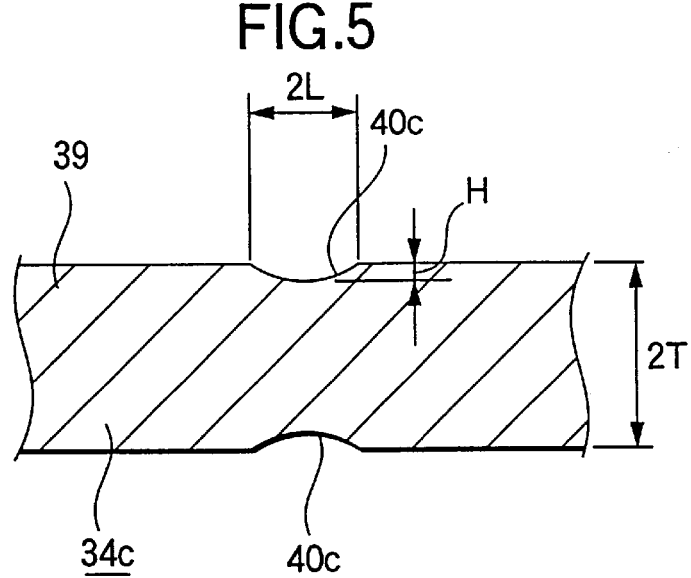
FIG. 5 is a view similar to FIG. 3, showing a second embodiment of a retainer according to the invention.
Figure 6:
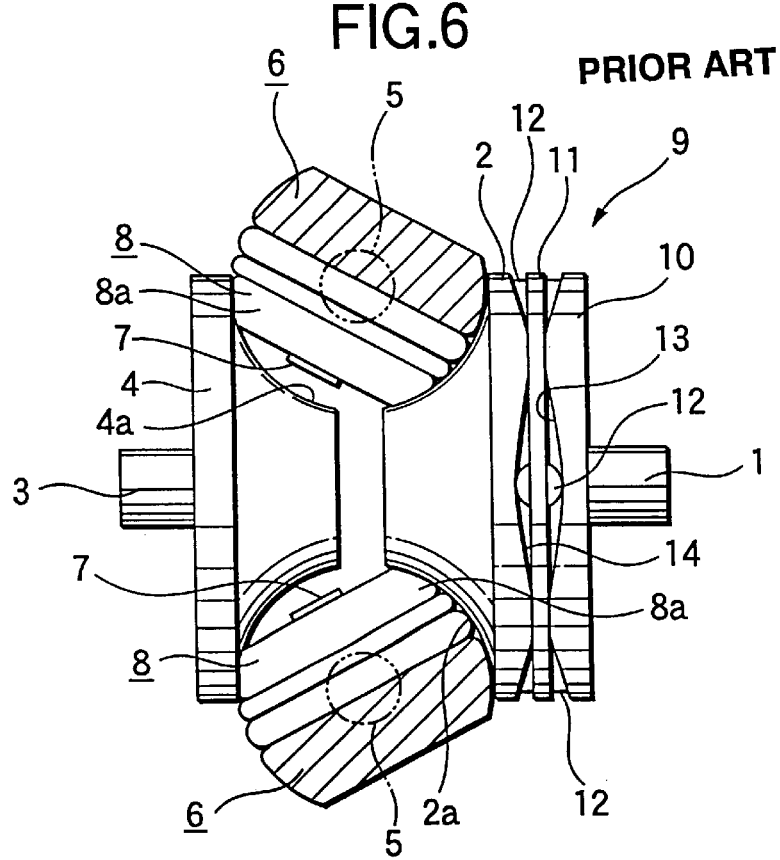
FIG. 6 is a schematically side view of the basic structure of a conventional toroidal-type continuously variable transmission, showing a maximum deceleration state thereof.
Figure 7:
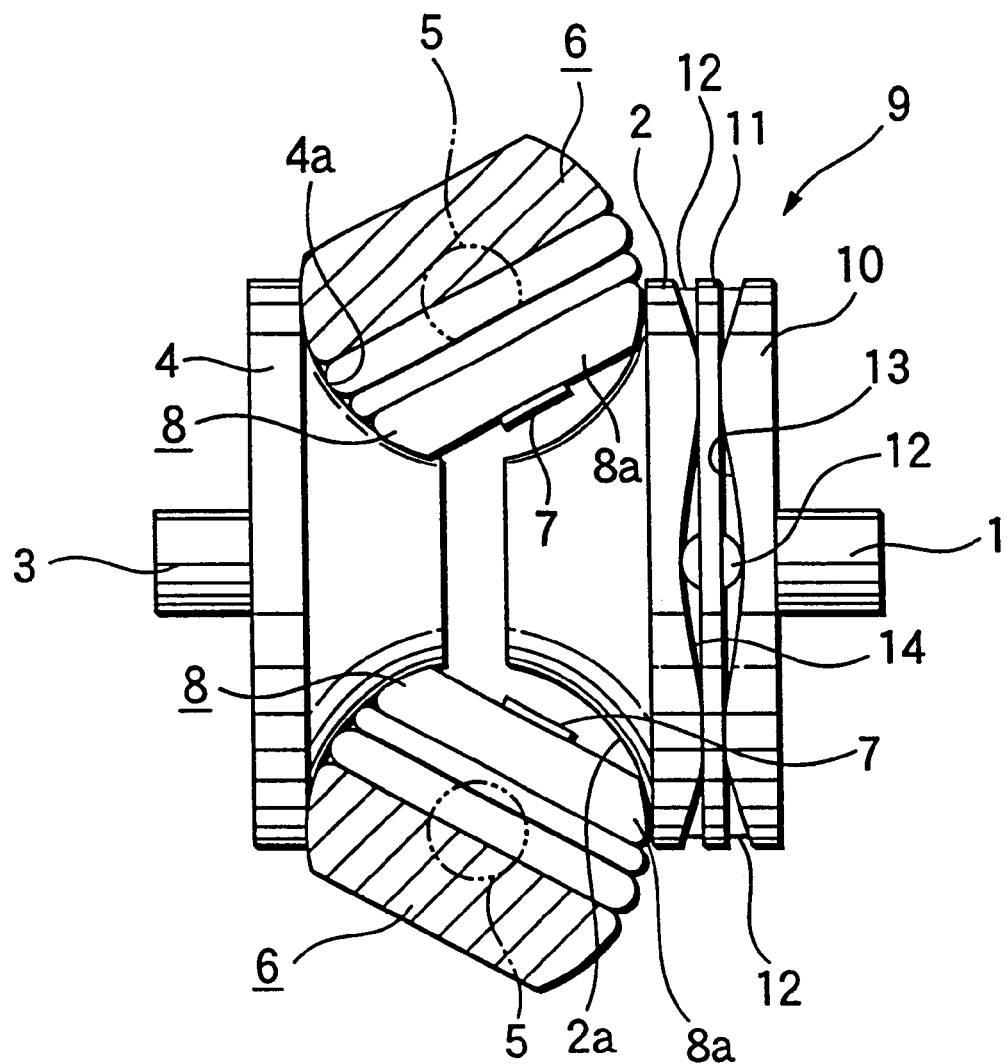
FIG. 7 is a schematically side view of the basic structure of the above conventional toroidal-type continuously variable transmission, showing a maximum acceleration state thereof.
Figure 8:
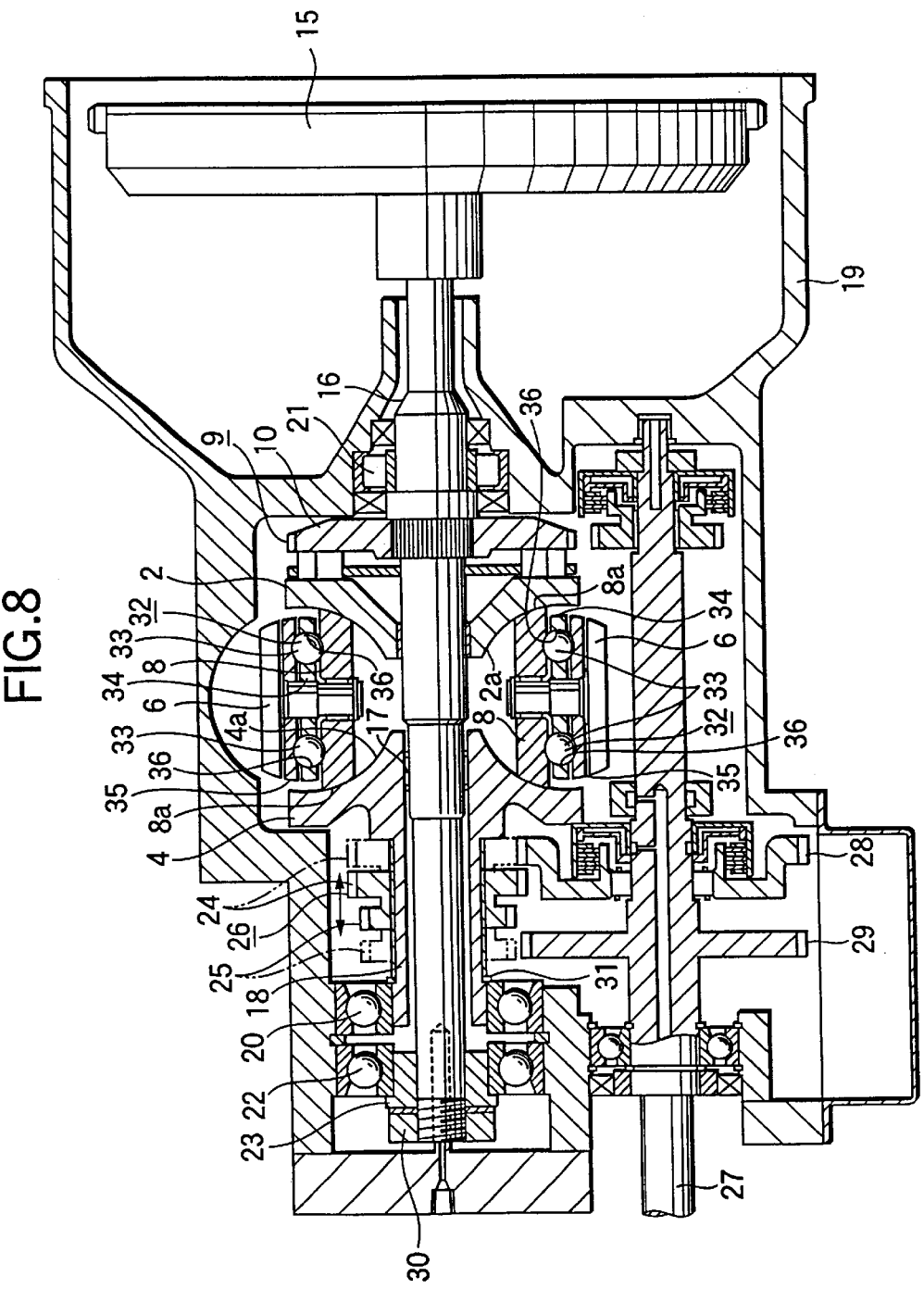
FIG. 8 is a section view of an example of a concrete structure of a conventional toroidal-type continuously variable transmission.

Next, FIG. 5 shows a second embodiment of a retainer according to the invention. In the present embodiment, in order to form a lubricating oil flow passage, there are formed recessed grooves 40c on the inner and outer surfaces of a retainer 34c in such a manner that they cross the pockets, and the sections of the recessed grooves 40c are each formed so as to have an arc shape. In the present embodiment as well, the ratio H/L of the axial-direction depth H of the recessed groove 40c to the circumferential-direction half-width L thereof is set in the range of 0.29–0.88. While preventing the retainer 34c from being damaged easily, the flow quantity of the lubricating oil flowing through the interior of the pocket 36 can be set large. (Note that the retainer 34c can be damaged easily in case where the section area of the lubricating oil flow passage to be formed by the recessed groove 40c is set excessively large.) As described above, as the section shape of the recessed groove forming the lubricating oil flow passage according to the present invention, there can be employed various shapes such as a rectangular shape and an arc shape.

As has been described heretofore, since a toroidal-type continuously variable transmission according to the invention is structured and operates in the above-mentioned manner, the lubricating efficiency of a thrust rolling bearing for supporting a power roller can be enhanced without lowering the strength of a retainer which is incorporated into the thrust rolling bearing. This can enhance the reliability and durability of a toroidal-type continuously variable transmission which incorporates the thus improved thrust rolling bearing therein.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

FIGS. 1(A) and (B) are cross sectional views showing a part of an ink cartridge mounting structure in an ink jet recording device.

What is claimed is:

1. A toroidal type continuously variable transmission comprising:
    first and second disks which are rotatably around center axes thereof respectively and have respective inner side surfaces in opposition to each other, each of said inner side surfaces having a concave section;
    a trunnion swingable around an axis transverse to the respective central axes of said first and second disks;
    a displacement shaft mounted on said trunnion;
    a power roller disposed between said first and second disks and rotatably supported by said displacement shaft, a peripheral surface of said power roller having a convex section that is brought in contact with said inner side surfaces of said first and second disks; and
    a thrust rolling bearing provided between said power roller and said trunnion to support a load applied to said power roller in a thrust direction, said thrust rolling bearing including a plurality of rolling elements and a retainer for rotatably holding said plurality of rolling elements,
    wherein said retainer comprises a substantially disk-shaped main body, a plurality of pockets formed in a radially intermediate portion of said main body and holding said rolling elements rotatably therein, and a plurality of lubricating oil flow passages extending between radially inner and outer peripheries of said main body so as to traverse respective pockets, and
    wherein each of said lubricating oil flow passages are sized so that:

$$0.8 \leq T/L \leq 2.5,$$

where 2T expresses the axial-direction thickness of said retainer and 2L expresses the circumferential-direction width of said lubricating oil flow passage, and further wherein each of said lubricating oil flow passages are sized so that the ratio of H/L is ±20% of a maximum dimensionless flow quantity value Q' for each ratio of T/L, where H expresses the axial-direction depth of said oil flow passage and where:

$$Q' = (H/L)^{3/2}(T/L - H/L)^{5/2}/(2 + H/L)^{1/2}.$$

2. The toroidal-type continuously variable transmission as set forth in claim 1, wherein each of said lubricating oil flow passages comprises:
    a recessed groove having a rectangular-shaped section.

3. The toroidal-type continuously variable transmission as set forth in claim 1, each of said lubricating oil flow passages comprises an arc-shaped section.

* * * * *